(Model.)
W. DAVENPORT.
BANANA CRATE.
No. 269,392. Patented Dec. 19, 1882.
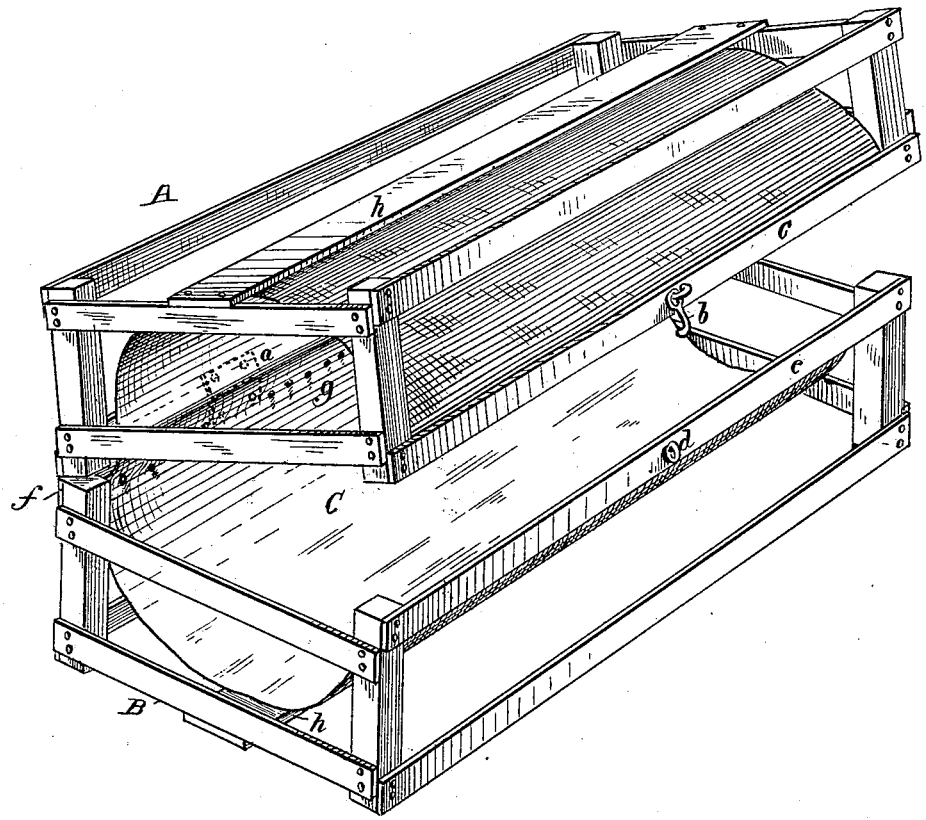
WITNESSES:
J. D. Garfield
C. Sedgwick
INVENTOR:
W. Davenport
BY Munn & Co
ATTORNEYS.

UNITED STATES PATENT OFFICE.

WILLIAM DAVENPORT, OF PHILADELPHIA, PENNSYLVANIA.

BANANA-CRATE.

SPECIFICATION forming part of Letters Patent No. 269,392, dated December 19, 1882.

Application filed May 26, 1882. (Model.)

*To all whom it may concern:*

Be it known that I, WILLIAM DAVENPORT, of Philadelphia, in the county of Philadelphia and State of Pennsylvania, have invented a new and Improved Banana-Crate, of which the following is a full, clear, and exact description.

This invention seeks to provide a box, frame, or crate in which bunches of bananas may be handled and transported without danger of injuring the fruit; and it consists of a frame of suitable size to receive a bunch of bananas, lined with canvas or similar material. The frame is preferably made of two parts hinged together. The canvas is so attached to the parts of the frame that when the frame is opened the canvas will be opened or spread out to receive the bananas, and when closed will suspend the bananas in the frame, so that the fruit will not be injured from contact with the inside of the bars of the frame or box. The bars of the frame protect the fruit from injury from contact with any outside objects.

Reference is to be had to the accompanying drawing, forming part of this specification, in which the figure is a perspective view of my new and improved banana-crate.

A represents the upper part, and B the lower part, of the frame. These parts are hinged together by the hinges $a$ $a$, (shown in dotted lines,) so that they may be opened and closed, as will be understood from the drawing. When the parts are closed they may be locked together by means of the hook $b$, attached to the bar $c$ of the upper part, and the staple or eye $d$ driven into the bar $e$ of the lower part of the frame. The canvas C in this instance is shown to be a continuous strip of a width about equal to the length of the box or crate. The ends of the strip are secured by means of tacks or similar fastenings to the inside of the bars $c$ and $e$, and the center of the length of the strip is secured by the tacks $g$ to the inside of the bar $f$ at the back of the frame, as shown clearly in the drawing. The length of the strip is such relative to the size of the box or frame that when thus secured the canvas in both parts of the frame will just clear the pieces $h$ $h$, so as to suspend the bunch of fruit above the said pieces, whether the crate be placed as shown in the drawing or the other side up. When the crate is opened it will be seen that the canvas will also be opened, ready to receive the bunch of fruit.

Instead of having the canvas in one continuous strip, two strips might be used—one for each part of the crate. In this case both strips would have to be tacked at the back of the crate, and, instead of providing the crate with two strips, one might be dispensed with; but in such case the crate could not be used either side up, as when both parts of the crate are provided with canvas.

By the use of this crate it will be seen that bananas may be handled and transported without the exercise of any special care, and that there will be no danger of jamming or otherwise injuring the fruit.

Having thus fully described my invention, I claim as new and desire to secure by Letters Patent—

The banana-crate made substantially as herein shown and described, consisting of the hinged parts A and B, in combination with the strip of canvas C, attached to the inside of the crate in such manner as to hold the fruit out of contact with the frame, as set forth.

WILLIAM DAVENPORT.

Witnesses:
SOLOMON CHORLEY,
PAUL T. HOEFLICH.